April 23, 1963  M. E. DINEHART  3,086,313

ARTIFICIAL LURES FOR GAME FISH

Filed Oct. 5, 1961

INVENTOR.
Marjory E. Dinehart
BY William B. Jaspert
Attorney.

United States Patent Office 3,086,313
Patented Apr. 23, 1963

3,086,313
ARTIFICIAL LURES FOR GAME FISH
Marjory E. Dinehart, 2276 Cremona Drive,
Bridgeville, Pa.
Filed Oct. 5, 1961, Ser. No. 143,102
2 Claims. (Cl. 43—35)

This invention relates to new and useful improvements in artificial lures for game fish, and it is among the objects of the invention to provide a lure having a head and tail portion and an intermediate body portion which latter may be termed the striking area in which a pair of normally retractable hook needle-like points are operable to snare the fish during the normal operation of retracting the bait or lure.

It is a further object of the invention to provide an artificial lure of the above-designated character in which the piercing members for snaring the fish are locked in closed position once the fish has been snared.

It is still another object of the invention to provide such a lure that is entirely free from extraneous elements that are likely to catch or engage obstacles which would cause the lure to snag and tear the line.

Figure 1:
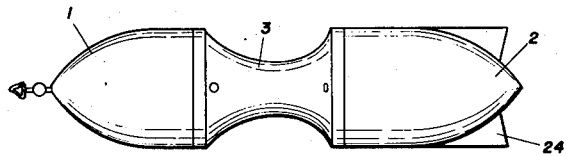
Figure 2:
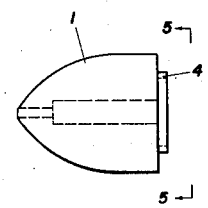
Figure 3:
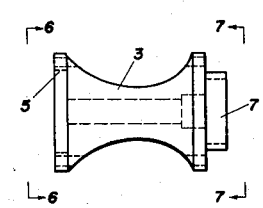
Figure 4:
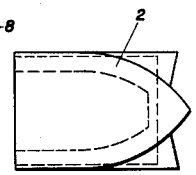
Figure 5:
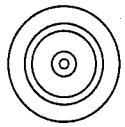
Figure 6:
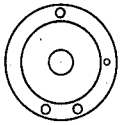
Figure 7:
Figure 8:
Figure 9:
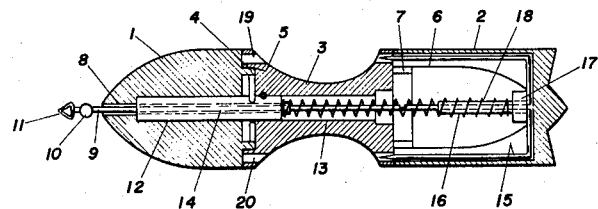
Figure 10:
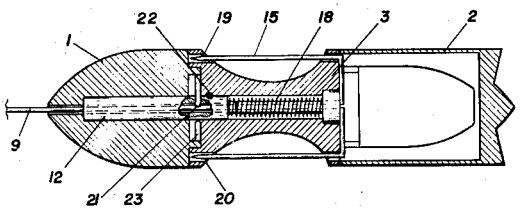
Figure 11:
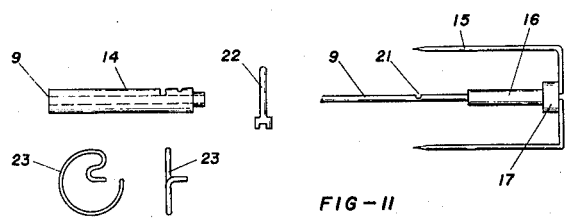

These and other objects of the invention will become more apparent from a consideration of the accompanying drawing constituting a part hereof in which like characters designate like parts and in which:

FIGURE 1 is a side elevational view of a fishing lure embodying the principles of this invention;

FIGURE 2 a similar view of the head of the lure;

FIGURE 3 a similar view of the central body portion of the lure;

FIGURE 4 a similar view of the rear or tail portion of the lure;

FIGURE 5 an end elevation taken along the line 5—5, FIGURE 2;

FIGURE 6 an end elevation taken along the line 6—6, FIGURE 3;

FIGURE 7 an end elevation taken along the line 7—7, FIGURE 3;

FIGURE 8 an end elevation taken along the line 8—8, FIGURE 4;

FIGURE 9 a cross-sectional view taken longitudinally of the lure showing the piercing element, connecting shaft and locking mechanism in elevation;

FIGURE 10 a cross section taken longitudinally of the lure similar to the view of FIGURE 9 showing the piercing element by which the fish is snared in closed position; and FIGURE 11 an exploded view of the piercing element assembly and its locking mechanism which for clarity shows a torsion spring in side and end elevation.

With reference to the several figures of the drawing, the numeral 1 designates the head end of a three-piece fishing lure, 2 the tail portion of the lure and 3 the intermediate or center portion, these being separate elements, as shown in FIGURES 2, 3 and 4 of the drawing. They may, of course, be made of wood, plastic or other materials that are of the floating or partially submerged types and of sufficient weight to be cast or trolled, as desired. The head element 1 is provided with a boss or flange 4 that seats in a recess 5 of the central element, as shown in FIGURE 9. The tail element is hollow and provided with a cylindrical body portion 6 that receives the flange or boss 7 of the central member which may be a pressed fit, as is also the member 4 in the recess 5.

The head element is provided with a central opening 8 for receiving a shaft 9 having a bead 10 and swivel 11, as is conventional. A counter bore 12 in the head portion 1 is provided and the same size bore 13 exists in the central portion 3. A sleeve 14 is disposed in the counter bore 12 and extends partly into the bore 13 of the middle portion, the shaft 9 extending through the middle portion 3 back into the rear or tail portion 2, as shown in FIGURE 9. A pair of sharp pointed pins 15 of U shape having a leg extending into a sleeve 16 are disposed in the cylindrical recess of the tail portion 2, these pin members being fastened to the sleeve 16 as by soldering, brazing or spot welding. A ferrule or ring 17 abuts the end of the pins 15, as shown in FIGURE 9, and a coil spring 18 seats against the ferrule 17 at one end and against the sleeve 14 at the other. The spring functions to normally bias the piercing pins 15 to the retracted position, as shown in FIGURE 9, and when the lure body is restrained against movement in a forward direction towards the head end, the spring 18 will yield and cause the piercing pins 15 to pass forward into holes 19 and 20, FIGURE 9. While FIGURE 9 discloses what appears to be a double piercing pin, it is evident that a treble piercing element could also be used, such being shown in FIGURES 7 and 8 of the drawing.

As shown in FIGURES 10 and 11, the shaft 9 is provided with a notch 21 for receiving a torsion spring 23 with a looped central end that locks shaft 9 in advanced position when the piercing pins 15 extend into the openings 19 and 20. This holds the snared fish until it is released, which is done by simply turning the head portion sufficiently to release the spring 23, which allows the piercing pins 15 to be retracted by action of the spring 18. The sleeve 14 is locked to the central body portion 3 of the lure by pin 22, as shown in FIGURE 10.

As shown in FIGURE 1, the tail end of the lure is provided with fin-like members 24 to maintain a more or less straight line of travel and the surfaces of the lure are contoured to prevent snagging any obstacles over which the lure may travel.

From the foregoing, it is apparent that a fishing lure of the character herein described is snag-proof and may be carried in the pocket without injury to the fisherman. It is operative to instantly snag the fish as it strikes the lure, provided of course the fish strikes the central portion 3 so that the piercing points 15 will pass through the mouth or lip when the lure is stopped in its forward travel, the pulling force then becoming effective to advance the piercing points 15 into the flesh of the fish.

Although one embodiment of the invention has been herein illustrated and described, it will be evident to those skilled in the art that various modifications may be made in the details of construction without departing from the principles herein set forth.

I claim:

1. A fishing lure comprising a head section, a tail section and a mid-section and a plurality of piercing elements housed in the tail section for movement into the mid-section, said piercing elements being mounted on a shaft extending through the mid-section and head section of the lure for attachment to a fishing line, said shaft extending to the tail section of the lure and a coil spring disposed around said shaft for normally holding said piercing elements in said tail section.

2. A fishing lure as set forth in claim 1 in which the shaft is provided with a notch and the head section is provided with a torsion spring for engaging said notch, the said notch being in register with said torsion spring to lock the shaft when the piercing elements are moved into the mid-section, and said shaft being adapted to be released by said spring upon slight rotation of the head section of the lure.

References Cited in the file of this patent

UNITED STATES PATENTS

| | | |
|---|---|---|
| 913,102 | Burke | Feb. 23, 1909 |
| 2,522,292 | Modesto | Sept. 12, 1950 |

FOREIGN PATENTS

| | | |
|---|---|---|
| 1,028,441 | France | Feb. 25, 1953 |